Oct. 17, 1961     S. McCULLOUGH     3,004,476
PROFILE MILLING MACHINE

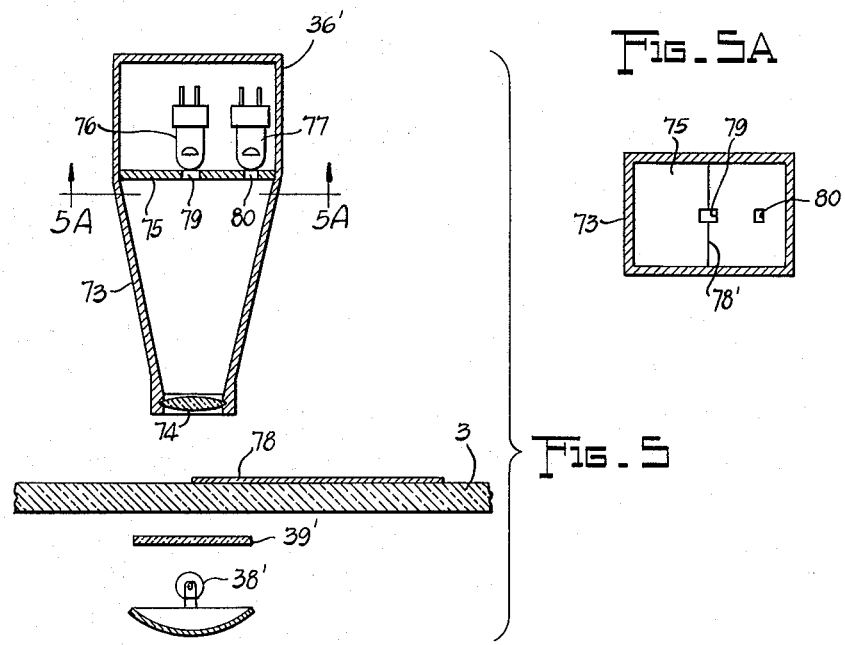
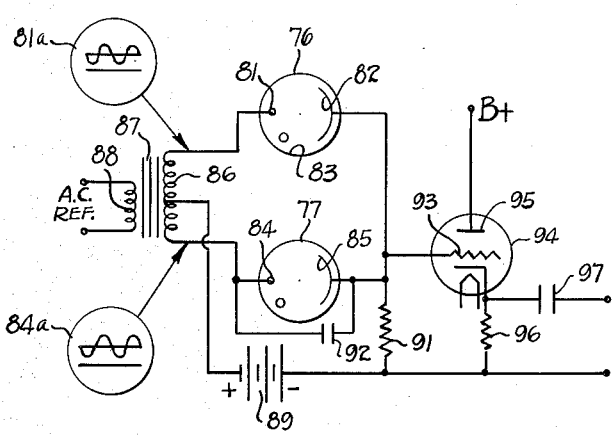

Filed April 24, 1959     7 Sheets-Sheet 5

INVENTOR.
STUART McCULLOUGH
By Bosworth, Sessions,
Herrstrom and Knowles
ATTORNEYS.

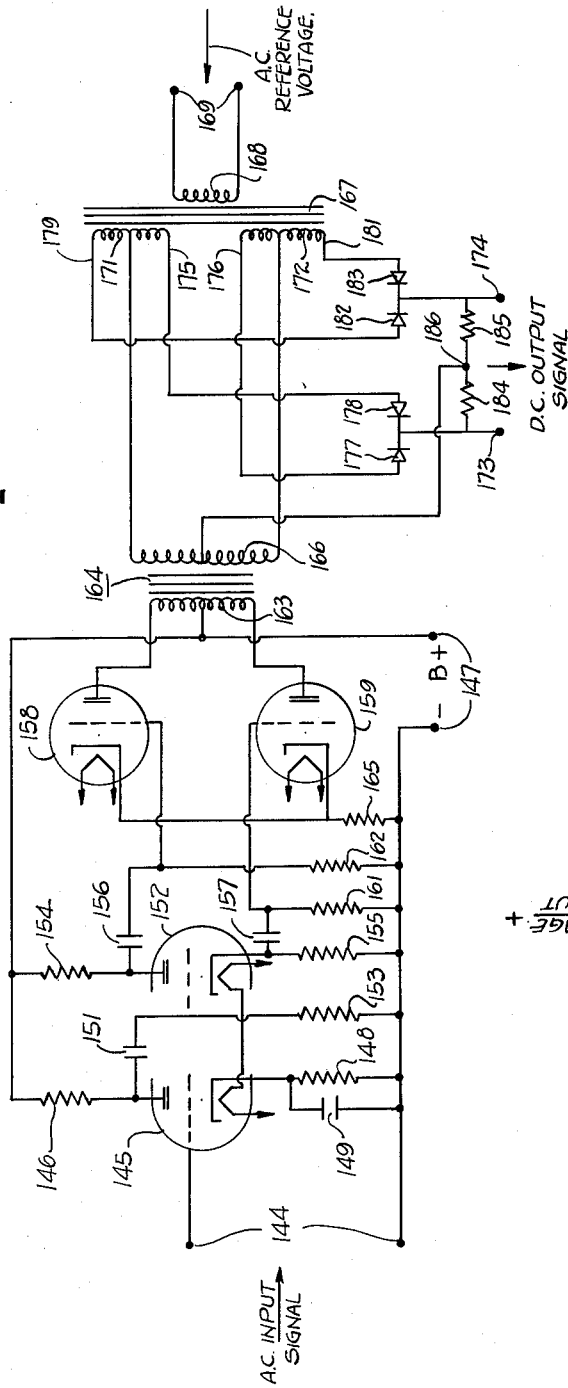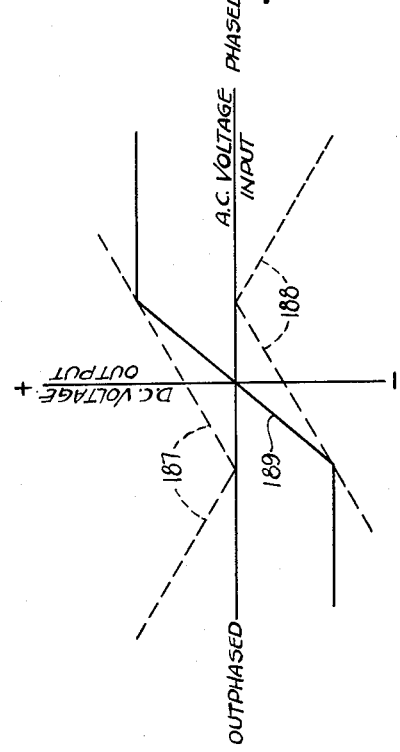

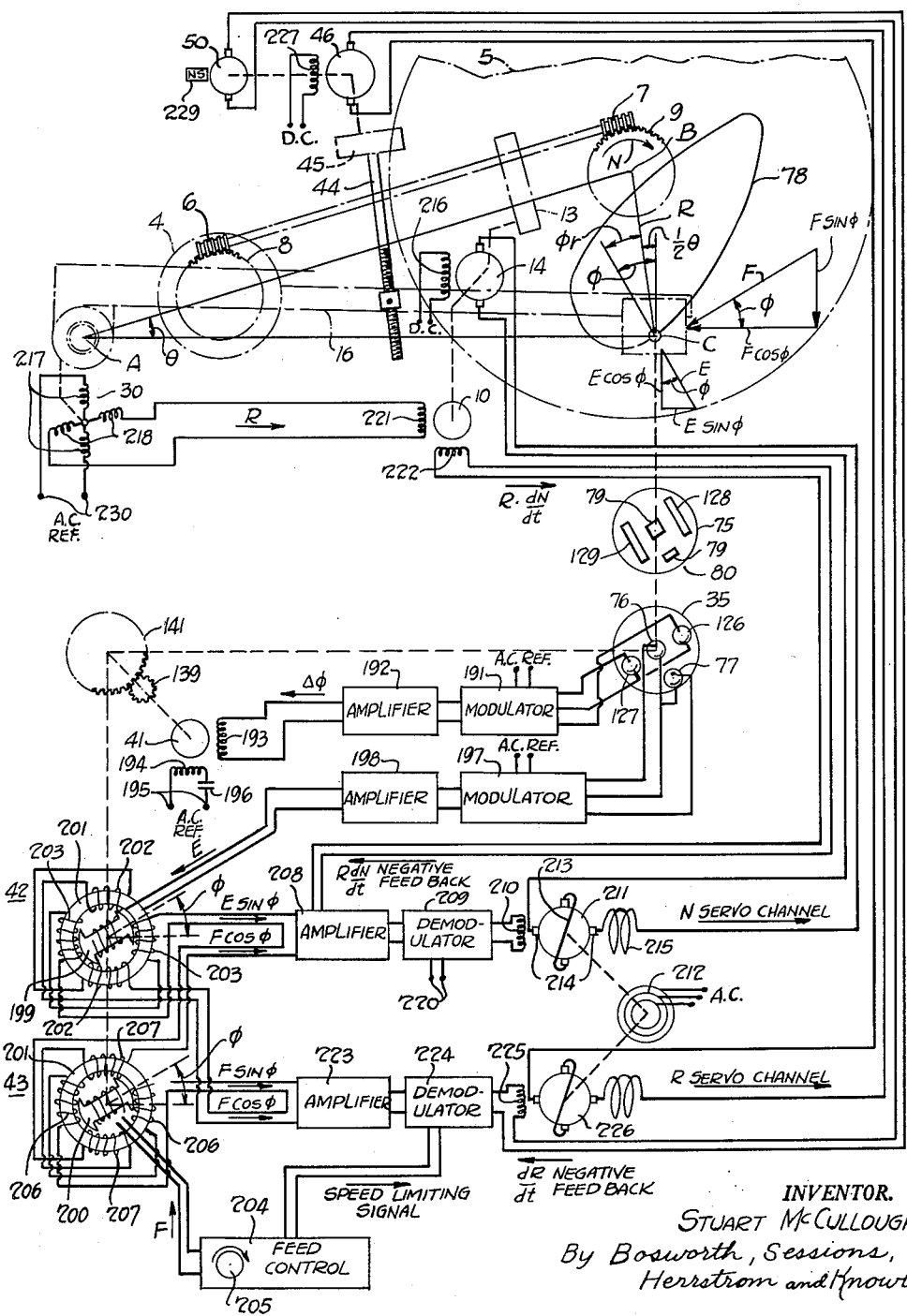

United States Patent Office 3,004,476
Patented Oct. 17, 1961

3,004,476
PROFILE MILLING MACHINE
Stuart McCullough, 18098 Karen Drive, Encino, Calif.
Filed Apr. 24, 1959, Ser. No. 808,759
10 Claims. (Cl. 90—13.4)

This invention relates in general to automatic machine tools and more particularly to a control system for milling machines effecting automatic reproduction of the contours or profile shapes of patterns or templets. The invention is also concerned with an optical tracer or follower and to an associated control circuit particularly adapted for use in a contour milling or profiling machine.

The commercially available profile milling machines in use at the present time follow in general the principle of providing some member in a tracing head which is maintained in actual physical contact with a master or templet. This member, which may be referred to as a stylus, is resiliently mounted in the tracing head and its displacement from a neutral position will effect actuation of some control element, either hydraulic or electrical, which in turn will energize the tracer positioning mechanism until the stylus is restored to its neutral position. The milling head is constrained through suitable means to follow the movement of the tracing head whereby to effect a reproduction of the templet in the work piece. In general, following the lead of the manually controlled milling machines, the automatic contouring machines have used an orthogonal displacement system making use of mutually perpendicular slideways. The control system in an automatic machine of the conventional type is substituted for the manual operator to control the longitudinal and transverse feed of the work table or saddle.

The adherence of automatic contouring or profiling machines to the orthogonal feed system that originated with manually controlled machines has necessarily made for lost motion problems, difficulty of demagnification, and high cost. It will be appreciated that the slideways required in these machines must be heavy in order to maintain the desired accuracy and that the machining of these slideways is necessarily expensive. As slideways tend to wear unevenly, it becomes increasingly difficult to eliminate lost motion and resulting inaccuracy of product. Accordingly it is an object of the invention to provide a contouring machine which avoids the use of slideways by making use of an approximately polar geometry involving a swinging beam to support the tracing and milling heads, and equiangularly controlled turntables or pivoted tables to support the templet and the work.

Another object of the invention is to provide a control system for a polar type contouring or profiling machine which will provide tangential feed of the work with respect to the milling head, and perpendicular error correction, that is error correction at right angles to the feed. Since the feed is tangential to the edge of the templet at all times, it follows that the error correction will be normal or perpendicular to the edge of the templet.

Another object of the invention is to provide such a polar type machine which is operable with a templet which does not enclose or overlie the center of the turntable.

Still another object of the invention is to provide such a machine which includes a control system that correlates the rotation of the turntables and the swinging of the beam to achieve a substantially constant feed velocity of the work with respect to the cutter along a tangent to the outline of the finished work.

The use of a stylus which must be maintained in physical contact with the templet entails certain disadvantages. The templet or pattern must be made of a relatively hard material if any considerable number of work pieces are to be made, as otherwise the stylus bearing against the templet will cause wear and loss of accuracy. In general, a templet made of a hard material is rather difficult to alter, especially where a dimension is to be increased. Due to the relatively high cost of such templets, the use of an automatic milling machine for short runs may be uneconomical as the cost of the templet may more than offset the savings in labor to be achieved through automatic profiling of the work. Accordingly a further object of the invention is to provide a tracer head adapted to operate with a form of templet which is inexpensive to make and which is readily alterable in shape and dimensions.

More specifically it is sought to provide an improved tracer head which does not physically engage or contact the templet, thereby completely avoiding wear of the templet and allowing the production of any number of pieces without any diminution of accuracy.

The best mode of practising the invention contemplates a tracer head using light or radiant energy as the sensing means to cause the tracer to follow the contour of the templet, this being a still further objective.

In accordance with such best and preferred mode of practising the invention in an automatic machine tool, there are provided means for supporting the work and the templet which means are constrained to equiangular circular motion. Such supporting means may take the form of turntables, one for the work and one for the master or templet with driving means for achieving equiangular motion as by means of gearing or a mechanical interlinkage. The outline of the templet is followed by a tracer head whose motion is reproduced, preferable on a reduced scale, by the mill head in operating on the work; this is achieved by arranging the tracer and mill heads for pivotal movement in unison about a common point. The tracer head functions through an electrical control system which provides an error signal E proportional to the relative displacement between the tracer head and the edge of the templet along the normal or error axis of the tracer. In addition, the electrical control system associated with the tracer head includes auxiliary detecting means which operates through a servomechanism to rotate the error axis and maintain such axis normal to the templet edge. A feed rate controller provides a signal F, set by the operator, to determine the rate of attack of the mill head upon the work. The error signal E and the feed signal F are translated by resolving means, also under the control of the tracer head, into trigonometric components of error and feed along axes substantially tangential and radial to the circular motion of the templet at the observation point of the tracer head. These components will also be tangential and radial to the circular motion of the work at the cutting point or axis of the mill head. The tangential components of error and feed rate are combined for controlling the circular motion of the supporting means, that is, for determining the angular velocity of the templet and work. The radial components of error and feed are combined for controlling the angular displacement of the tracer and mill heads about their common pivot point. By means of such resolution and recombination of error and feed rate components, the invention achieves a substantially constant rate of feed at the mill head and substantially constant accuracy of reproduction of the work relative to the templet around the entire outline of the templet.

An important feature of the invention is an optical or radiation type tracer head making use of radiation-sensitive photoelectric devices or cells to follow the outline of the templet and to detect changes in its direction and to effect corresponding directional control changes in an associated angular control system. Another feature of the invention is an optical tracing head including a pair of radiation-sensitive devices or photoelectric cells in a novel combination wherein one of the photocells operates as a reference and the other as a control jointly to provide a signal which varies in phase and magnitude with the direction and extent of departure of the control photocell line or axis of sight from the edge of the templet. A marked advantage of this photocell combination is that it is responsive primarily to the distribution of light about the observation point and its balance condition is substantially insensitive to the absolute level or intensity of illumination.

In the illustrated embodiment of the invention which represents the preferred mode of utilizing the principles herein set forth, the tracer head comprises a control and a reference photocell which are mounted for illumination from a diffuse source located below an opaque templet. The photocells are suitably inclosed or covered by a mask which provides a separate aperture for each photocell, that for the control photocell being approximately double in area that for the reference photocell. The photocells are connected in an A.C. bridge such that when both cells are equally illuminated and have equal conductivity, the output of the bridge is zero. This condition is achieved when the image of the edge of the templet bisects the aperture of the control photocell. Any departure from this condition will cause the production of an alternating current error signal whose phase will invert or change upon reversal of the direction of departure, and the magnitude of which will, in general, be proportional to the extent of departure or error.

The tractor head also includes a second or auxiliary pair of photocells which operate as tangency detectors. They are located on either side of the control photocell and the mask is provided with sight apertures for these angency photocells in the form of elongated parallel slots of substantially equal area. The slots have their longer dimension parallel to the axis common to the apertures for the control and reference photocells, have their centers on a common axis with the center of the control aperture, and are symmetrically located with respect thereto to the control aperture. When the tracing head is tangential to the templet, that is when it is oriented with respect to the edge of the templet such that the axis common to the control and reference apertures, henceforth referred to as the error axis, is normal to the edge of the templet, the slotlike sighting apertures for the tangency photocells will each be equally shadowed by the image of the templet and the cells will be equally illuminated. If the error axis departs from normality, the cells will be unequally illuminated. The tangency photocells are connected in an A.C. bridge similar to that previously mentioned whose output is an A.C. signal varying in phase and magnitude with the direction and degree of departure of the tracer head from tangency to the templet, or in other words, with the deviation of the error axis from normality to the edge of the templet.

In accordance with the invention, the signal from the tangency photocell bridge is utilized to control a servomechanism which rotates the tracer head with respect to a horizontally swingable supporting beam of the machine and maintains the tracer path tangential to the edge of the templet. If the angle which a tangent to the templet at the observation point of the tracer makes with respect to the axis of the support beam be denoted by $\phi$, then the function of the tangency photocells and associated servomechanism is primarily to rotate the tracer head through the angle $\phi$.

According to a further feature of the invention, a pair of resolvers are coupled to the servomechanism and likewise rotate through the angle $\phi$. These resolvers provide output signals, one of which is the sin $\phi$ function of its input signal and the other of which is the cos $\phi$ function. The first resolver is supplied with E, the error signal from the tracer unit; the second resolver is supplied with F, a feed rate signal from a controller set by the operator of the machine. The outputs of the resolvers are combined to supply an "N" servo channel with the signal $E \sin \phi + F \cos \phi$, and to supply an "R" servo channel with the signal $F \sin \phi + E \cos \phi$. The "N" servo channel controls the rotation of the turntables, whereas the "R" servo channel controls the swinging of the beam. In the illustrated embodiment of the invention, the resolvers are in the form of electrical pick-up units each having a rotor carrying an input winding and a fixed stator carrying pairs of windings displaced by 90 electrical degrees. Each servo channel comprises an electronic amplifier followed by a demodulator which converts the A.C. signal into D.C., and followed in turn by a rotating D.C. amplifier consisting of a separately excited D.C. shunt generator of the type commonly known as an amplidyne.

For further objects and advantages and for a better understanding of the invention, attention is now directed to the following detailed description and accompanying drawings of a preferred embodiment of the invention. The features of the invention believed to be novel will be more particularly pointed out in the appended claims.

In the drawings forming part of the specification and wherein like numerals denote corresponding parts in the several figures:

FIG. 5 is a diagrammatic illustration of a simplified photocell pick-up unit embodying the invention;

FIG. 5A is a sectional view illustrating the mask located in front of the photocells;

FIG. 6 is a schematic diagram of the photocell bridge circuit;

FIG. 8 is a schematic diagram of an electronic A.C. amplifier and of a demodulator circuit for converting the A.C. signal into a D.C. signal whose polarity and magnitude are determined respectively by the phase and magnitude of the A.C. input signal;

FIG. 8A is a graph illustrating the performance characteristics of the demodulator; and FIG. 9 is a combined electrical and mechanical schematic diagram illustrating the control system of a polar type profile milling machine embodying the invention and such as is illustrated in FIGS. 1 and 2.

*General construction*

Figure 1:
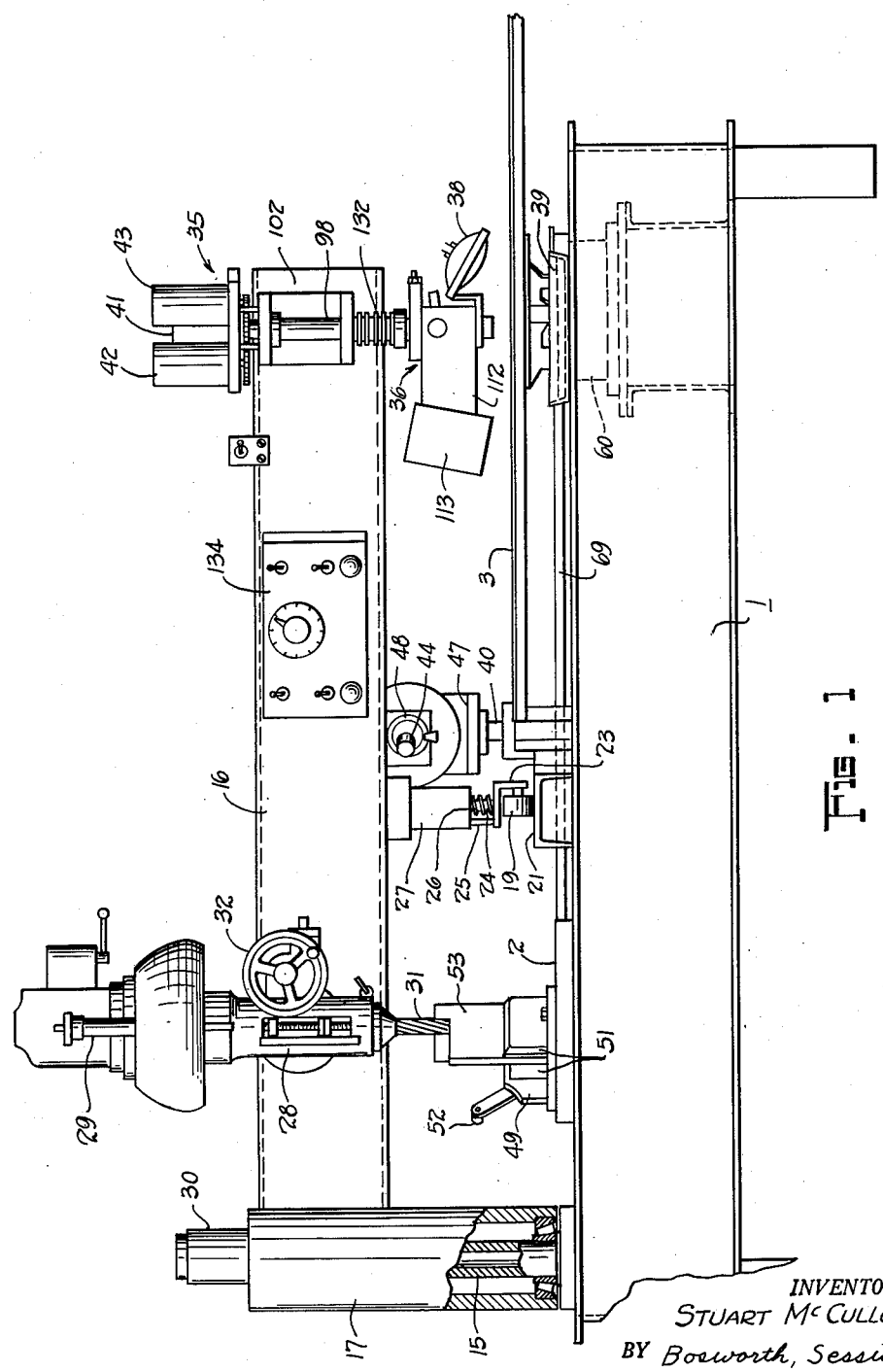
FIGS. 1 and 2 are side elevation and plan views respectively of a profile milling machine embodying the invention.
Figure 2:
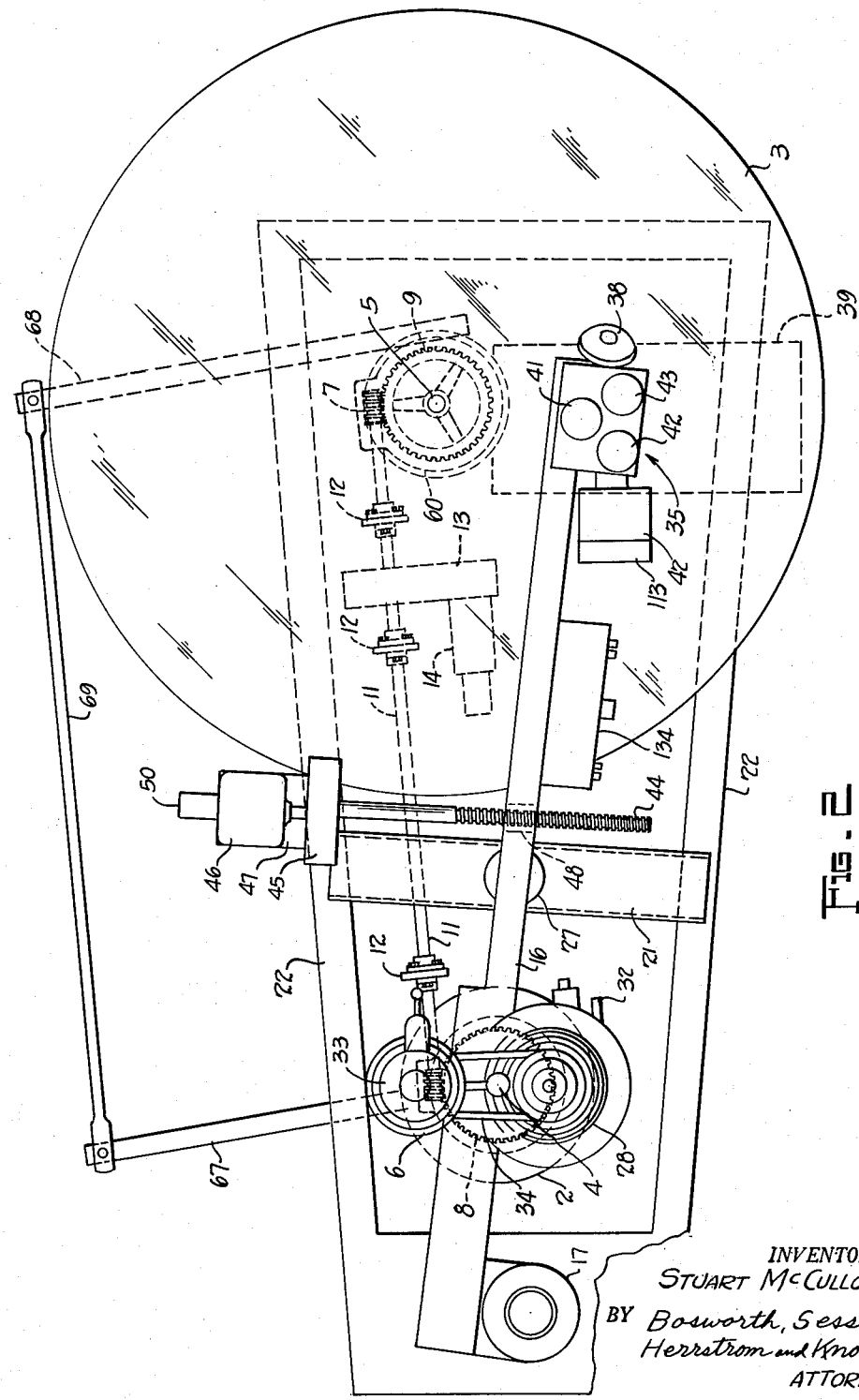

Referring to FIGS. 1 and 2, there is shown an approximately polar type automatic milling machine comprising a base 1 on which are rotatably mounted a work table 2 and a master or templet table 3. These tables rotate about horizontally spaced vertical axes 4 and 5 and are driven by worms 6 and 7 engaging worm gears 8 and 9 respectively. The worms 6 and 7 are driven through shafts 11, flexible couplings 12 and gear box 13 by variable speed shunt wound D.C. motor 14.

A vertical pivot post 15 supports a horizontal beam 16 allowing it to swing in a horizontal plane above the turntables 2 and 3. The axis of the post is so placed that when the axis of the milling spindle coincides with the axis of the work table 4 the axis about which the pickup head turns coincides with the axis of the master table 5. In the instant embodiment, the distance from the pivot post axis to the master table axis is four times the distance from the pivot post axis to the work table axis. With this relationship, the templet is made four times the size of the work. This scale was chosen because it is a sufficient ratio to permit a sizable gain in arithmetical tolerance and makes possible direct layouts of templets for tolerances of production down to about ±0.0015" and without requiring templets so bulky as to defy inspection measurements with ordinary machine shop equipment. Other ratios may, of course, be adopted.

The mechanical support of the beam 16 is achieved through a vertically elongated hub 17 to which it is attached and which bears on the post 15 through tapered roller bearings at the ends of the hub. In FIG. 1, the hub is shown cut away at its lower extremity to expose a tapered roller bearing 18. To reduce the flexure of the beam, and consequent dynamic loads imposed by vibration, there is provided an intermediate support in the form of a spring-loaded damper device carrying at its lower end a wheel 19. Wheel 19 serves as a sliding friction reducing means and describes an arcuate path, during pivotal movement of the beam, while riding on a transverse channel member 21 supported between spaced side frame members 22 of the machine. Wheel 19 is supported through an L-shaped bracket 23 carried at the lower end of a rod 24 and is maintained in alignment by a vertical slide rod 25. Rod 24 is urged down by a spring 26 and works out of a hydraulic vibration damper 27. Vibration damper 27 may be a piston-liquid filled cylinder structure similar to the "airplane" type shock absorbers in general commercial use, for instance in automobiles. Spring 26 takes up at least part of the weight of the beam and relieves the bending movement on the post. The damper device, by interconnecting the beam and the frame at a point removed from the pivot post, substantially reduces or eliminates vibration, thereby making it feasible to use relatively light structural members instead of heavy cast pieces for the machine. It is preferable that most of the weight of the beam 16 and the components carried thereby be borne by the spring 26 of the intermediate support. For this reason the roller 19 and its track 21 are located at or outwardly of the center of gravity of the beam assembly. A suitable location, as shown, is closely adjacent the periphery of the master turntable 3, intermediate the tracing and milling heads. A suitable arrangement provides a spring 26 of sufficient strength normally to carry about 60% to about 90% of the weight of the beam assembly. The optimum strength of the spring is that which eliminates eccentric loading of the bearings in the beam hub 17 and thus will vary with the distance of the wheel 19 from the vertical swing axis of the beam.

The beam 16 supports a work head or mill head 28 which carries a milling cutter for rotation on a vertical axis. The mill head is located above the work turntable 2 inwardly of the support roller 19 and is of commercially available type. It comprises a vertical spindle 29 which supports in a tapered socket at its lower end, a milling cutter 31. Suitable means including a hand wheel 32 adjusts the vertical elevation or height of the cutter. The cutter and the spindle are driven by an electric motor 33 through pulleys and a flexible coupling belt 34 in conventional fashion.

At the outer extremity of the beam 16 is mounted the tracer head 35. The tracer head includes a pick-up unit 36 comprising the photocell error and tangency detectors and will be more fully described later. A light source 38, which may be a lamp of the sealed beam type, is supported on the side of the tracer head and projects light downwards through the transparent master turntable 3 onto a light diffuser 39 which may conveniently consist of a flat box filled with table salt. The light is diffused and reflected by the salt crystals and illuminates the underside of the turntable and the templet supported thereon. The photocells in the pickup unit receive the upwardly directed light, and the quantity of light received by each photocell is influenced by the position and alignment of the unit with respect to the edge of the templet.

The output signal from the one pair of photocells which serve as the tangency detectors is supplied, after suitable amplification, to a servomotor 41 which is mechanically geared to turn the pickup unit so that its error axis is maintained perpendicular to the edge of the templet at the sensing point. The tracer head also comprises a pair of resolvers or pickup units 42, 43 whose rotors are geared to rotate in unison with the pickup unit.

The distance from the tracer head axis to the pivot post axis is four times the distance from the cutter axis to the pivot post axis in accordance with the 4 to 1 templet to work ratio of the machine. The tracer head 35 and the mill head 28 swing in arcs which intersect respectively and simultaneously the axes of the master turntable 3 and work turntable 2. The swinging of the beam 16 is achieved through a screw 44 which is rotated through gear box 45 by D.C. shunt-wound motor 46. The motor and the gear box are mounted as a unit for oscillation about a vertical axis on a pivoted pedestal 47 supported on an upright post 40 which turns about a vertical axis and is held in a suitable mount carried by the rear frame member 22. The screw 44 engages in a pivoted nut 48 carried by the beam 16.

The work table 2 is of conventional construction and has sufficient strength and rigidity to withstand the stress resulting from the milling operation without bending or distortion. As illustrated in FIG. 1, it is provided with suitable means for holding the work, such as a vise 49 having compression jaws 51 controlled by hand lever 52 for gripping work 53.

The master or templet turntable 3 is made of transparent, or at least light-transmitting, material in order to permit illumination of the templet from its underside. With an opaque templet, this causes a sharp contrast in illumination at the edge of the templet. It will be appreciated however that such contrast could be achieved in other ways, for instance by a white templet on a dull black table, the illumination then being provided from above the table.

In the illustrated embodiment, the turntable proper comprises an upper glass plate 54 which may consist of ¼" thick plate glass superimposed on a transparent plastic disc member 55 of the same diameter. The plastic disc may consist of 1" thick methacrylate resin commonly known as Plexiglas, the thickness in this case being desirable for strength in order to reinforce the glass plate. Other means may be provided for supporting the glass plate and, if deired, the glass plate may be supported on a suitable spider without the underlying transparent plastic plate, such a construction being quite suitable for smaller machine sizes. It is desirable however, that the upper surface of the table be made of glass, or at any rate of hard, scratch-resistant material that is not thermoplastic. It will be appreciated that in use, hot chips from the milling cutter may strike the turntable with a resultant tendency to melt the plastic, and the table may be easily scratched when being wiped off. If a deep scratch should occur near the edge of a templet, the tracer head might be momentarily deflected by it. An excessively scratched table would diffuse rather than transmit light.

Both the glass plate and the plastic disc are centered with respect to the turntable by the arrangement of aligned pilot holes which accommodate reduced top end 56 of vertical shaft 57. The glass plate is cemented or screw fastened to the plastic disc about its periphery and the plastic disc is secured by counter-sunk screws 58 to steel mounting ring 59 which is welded to three-legged metal spider 61. The radial spider legs are welded along their lower ends to horizontal support ring 62 which is clamped releasably to turntable 63 by means of internal triangularly shaped clamping plate 64 and fastening screws 65; the spider is additionally supported by a central hub 66 to which the inner margins of the legs are welded. The hub 66 is in the form of a cylindrical tube which embraces the upright rod or shaft 57 to retain the ring 62 centered on the turntable 63. Turntable 63 may be of conventional construction such as commonly used in the machine tool industry and, as previously mentioned, is driven by a worm which engages worm gear 9 on the underside of the turntable. The turntable rests on a support 60 carried by suitable frame cross members (not shown) and is located and held against lateral displacement by an integral stem 90 which turns in a sleeve bearing 100 also held by the support 60.

When the work table and the templet table are both driven by worm gear drives as have been described, some backlash will inevitably be present when the direction of rotation is reversed. Although the backlash in the two tables may be equalized fairly closely, it is in general not practical to attempt to achieve exact equalization. The control system is not designed to attain the same accuracy with rotary table motion as is attained with beam motion when moving slowly because the speed ratio which would be required for the former in order to achieve equal accuracy would be much greater than that required for the latter. The accuracy of rotary table motion when following at higher speeds or positioning to rest is however nearly equal to that of the beam motion. In the machining of cams, for example, the lesser accurcy of rotary table motion is not of much importance because the turntable is not ordinarily required to reverse or run at very low speeds. Also, in the case of special shapes such as blades for turbines or air foils (these being cut off-center with respect to the turntables) the tolerances on chord length are generally much looser than those on thickness, so that the lesser accuracy of rotary table motion can again be tolerated when the work and templet are mounted so that chord length is circumferential rather than radial.

Where backlash error on reversal must be eliminated, however, as when machining small objects on the edge of the table, the worm gear drive to the work table through the clamping plate 64 may be disengaged by loosening the screw 65. The work table 2 is then connected to the templet turntable by means of an arm linkage shown to advantage in FIG. 2 and comprising arms 67, 68 and connecting link 69. Arm 68 is fastened to an outer ring 70 which embraces the mounting ring 62 and whose inner edge fits rotatably under the under-cut lip defining the circular periphery of the mounting ring 62. To engage the arm linkage, clamps 71 are tightened by means of screws 72 and lock the outer ring 70 to the mounting ring 62. A similar arrangement on the work table 2 permits locking the arm 67 through its cooperating ring to that table. The ring to which the arm 67 is secured is similar to the ring 70 and permits releasable securement of the arm 67 to the work table. The templet table and the work table are thus mechanically linked together through the arms 67 and 68 of relatively great length and the link 69 which is pinned to the outer extremities of the arms providing very large demagnification of any residual backlash to the point of substantially complete elimination. It will be appreciated however that with the arm linkage, the angular rotation of the tables is necessarily limited to the range within which the arms clear the tables and other machine parts, such range being about 80° in the illustrated embodiment. Of course, for machining small parts on the edge of the table where reversal of table motion occurs, such limitation of angular range is unimportant. On the other hand for machining large cams and the like where rotation through 360° is required, the worm drives are used but since there is no reversal of motion of the turntables, the backlash error does not arise.

*Tracer head*

In accordance with another feature of the invention there is provided a tracer head of an optical type incorporating photocells as the detecting elements. A desirable property of an optical detecting device is that it have small depth of focus in the plane in which it is required to respond: this minimizes the effect of disturbances above and below that plane. It is also desirable to take into consideration the possibilities of variation in ambient illumination, and table and lens cleanliness. The amount of light produced by the direct source may vary, due for instance to variations in line voltage or aging of the lamp. The invention provides a solution to these problems in a photocell detecting unit of a null-balance character whereof the output signal is a function of the distribution of light reaching it rather than the absolute quantity of light. As regards those elements entering into the null balance, the unit avoids the use of moving parts, an obvious advantage from the point of view of maintenance of accuracy.

A photocell detection or pick-up unit 36' embodying the invention is shown in basic form in FIGS. 5 and 6, the former showing the elementary mechanical and optical relationships, and the latter the circuit connections. It will be understood that the pick-up unit now to be described is in the nature of an elementary device which most readily illustrates the principles involved, and that it is not the pick-up unit used with the tracer head of the preferred embodiment of the invention illustrated in FIGS. 1 and 2.

Referring to FIG. 5, the pick-up unit 36' comprises a light-tight box 73 provided with an objective lens 74 at its lower end, with an intermediate partition or mask 75, and a pair of photocells 76, 77 which are mounted above the mask 75. The pick-up unit is intended to be supported by the beam 16 at a fixed height above the turntable 3 supporting templet 78 so that the objective lens 74 focuses a real image of the edge of the templet onto mask 75. For purposes of illustration herein, the light source is shown at 38' below the templet turntable, and the diffuser is shown at 39' as a translucent plate such as a ground glass interposed between the light source and the turntable. The mask 75 located in front of the photocells is provided with a central aperture 79 located in front of the light responsive cell 76 and a rim or side aperture 80 located in front of the light responsive cell 77. As illustrated in FIG. 5a, the area of the central aperture is substantially double that of the rim aperture.

Photocell 76 thus serves as the control photocell and receives a quantity of light which is a function of the position of the templet image or shadow line 78' relative to the central aperture 79, which position in turn is a function of the relative positions of the templet 78 and the tracer head 36'. Since the area of the central aperture 79 is double that of the rim aperture 80, the control photocell will in general receive a quantity of light equal to that received by the reference photocell when the image of the edge of the templet bisects central aperture 79. Under this condition, the control photocell may be regarded as being half fully illuminated and half fully shadowed (assuming a perfectly opaque templet and the absence of diffused light from various sources), whereas the reference photocell is fully illuminated through an aperture of half the size, with the result that both photocells are effectively receiving equal quantities of light. It will be appreciated that the necessary operating condition is that both apertures receive substantially equal quantities of light when the central aperture bisects the edge of the templet, that is, the boundary between regions of high and low illumination and the rim aperture receives light from the region of low illumination. Evidently where the contrast is not absolute, the area of the rim aperture is made greater than one half that of the central aperture as required to achieve the above-stated condition.

If the pick-up unit is displaced to the right with respect to the templet as shown in FIG. 5, a greater portion of the central aperture will be in the shadow of the templet so that the amount of light received by the control photocell is reduced whereas that received by the reference photocell remains substantially unchanged. It will be appreciated that the objective lens causes a reversal of the templet image at the mask to that displacement of the pick-up unit to the right with respect to the templet causes the shadow image or projection of the templet to move to the right with respect to the mask. If the displacement of the pick-up unit with respect to the templet should be great enough to cause the shadow image of the templet to extend over into the rim aperture 80 of the reference photocell 77, there would be a change in the quantity of light received by the reference photocell. Such condition is outside the operating range of the unit, the effective control range of the unit being the width of the central aperture 79 as projected by the objective lens 74 into the plane of the templet 78. It will be appreciated that the objective lens magnifies the image of the templet at the mask (and conversely reduces the image of the mask at the templet) by a ratio equal to the distance from the lens to the mask divided by the distance from the lens to the templet. By suitable choice of optics, the dimensional sensitivity of the unit can be made very great if desired. In the selected arrangement shown here the lens-mask dimension is several times the lens-templet dimension to give the desired high sensitivity.

The photocells 76, 77 illustrated schematically in FIG. 6 are of the photo-emissive type each comprising an anode 81, 84 and a cathode 82, 85, respectively, sealed within an envelope 83 preferably filled with a suitable low pressure gas. The cathodes are coated with a light-sensitive electron-emissive material such as lithium oxide for instance, whereby the conductivity of each cell varies with the amount of light reaching its cathode. The photocells designated commercially 1P21 and 921 are suitable for the instant purpose. However, other photocells or radiation-sensitive devices could be used with suitable circuit modifications.

The two cells are connected in an alternating current bridge whereby anodes 81—84 are supplied with a voltage which is the sum of an A.C. voltage and a D.C. voltage, the A.C. voltage supplied to one photocell being 180° out of phase with that supplied to the other. To this end, anodes 81—84 are connected to opposite ends of center-tapped secondary winding 86 of transformer 87 whose primary winding 88 is supplied with alternating current at a reference phase, for instance, the ordinary 115 v., 60 cycle supply. The center tap of the secondary winding is connected to the positive side of a unidirectional supply, here shown as a battery 89, and the circuit is completed to the cathodes 82—85 through a common load resistor 91. The D.C. component of anode voltage is necessary to avoid a polarity reversal of the phototube anodes, because the photocells exhibit the characteristic of a rectifier. The circuit may be considered as constituting a bridge whereof one pair of adjacent legs or branches is constituted by the transformer secondary halves connected between the center tap and the anodes, and whereof the other pair of adjacent legs or branches is constituted by the photocells. Considered in this fashion, the battery 89 and the load resistor 91 are connected in series across a pair of conjugate points of the bridge.

Assuming for the time being that the photocells are linear circuit elements, the instantaneous value of current thru a photocell would be proportional to the product of the incident light and anode voltage and thus the wave form of the currents passed by each photocell would be a sine wave superimposed on a D.C. component. The average current through each cell is then approximately proportional to the quantity of light falling on it. The A.C. component produced across the load resistor 91 is, in such case, the sum of the A.C. components passed by the two photocells. Since the A.C. voltage supplied to one photocell is 180° out of phase with that supplied to the other (as illustrated by anode waveforms 81a, 84a), the sinusoidal component across the load resistor is zero when the cells are equally illuminated. When the illumination of the photocells is unequal, there is a net sinusoidal resultant across the load resistor the magnitude of which is proportional to the difference in the amount of light falling on the cells and the phase of which is indicative of which cell receives the more light. The output voltage across the load resistor 91 is thus indicative, through its phase and magnitude, of the direction and extent of displacement from the edge of the templet of the sight axis of the pick-up unit (as determined by a central line through the objective lens 74 and the central aperture 79).

The photocell pick-up unit is essentially a null balance system because the A.C. component of voltage is zero when zero error exists. This is a decided advantage since it eliminates the need for relying upon the absolute values of illumination of the templet, or light transmission through the optical system, or conduction characteristics of the photocells. Furthermore since the output signal is an A.C. signal, it admits readily of amplification through conventional electronic tube amplifiers, which again is a decided advantage.

Whereas it has been assumed in the foregoing description that the photocells behave as linear circuit elements, that is not a necessary condition for the successful operation of the photocell bridge. The departure from linearity of conductivity with respect to illumination of a photocell will cause the signal to depart from exact proportionality to the error and causes some minor distortion of the output wave form. However, this effect can be reduced or substantially eliminated if desired by compensating for the non-linearity of the photocell by means of a non-linear circuit element whose departure from linearity is in reverse direction to that of the photocell, in accordance with well known principles. In practice the use of dry disc rectifier plates in the circuit energizing the transformer primary has resulted in a substantially sinusoidal output wave being produced.

Since actual photocells present capacitance as well as conductance to the circuit, it is sometimes necessary to neutralize the resulting false signal which may be larger in magnitude than the true signal when the error approaches zero. The false signal due to the unequal capacitances of the photocells is of course advanced in phase with respect to the true signal, and in theory should not affect a demodulator responsive to signals either in phase or 180° out of phase with a reference voltage. However, it is preferable to eliminate as much as possible the false signal at its source, and this may be done by connecting a small adjustable capacitor across the photocell having the lesser capacitance. A variable capacitor 92 is shown connected in parallel with photocell 77 in the drawing to illustrate the principle.

In actual tests of a pick-up unit with an automatic profile milling machine embodying the invention, it has been found that, with the observance of proper precautions, gas-filled photocells may be used quite safely at ordinary room light levels in a system in which the maximum tolerable control system error corresponds to a 5% change in the total light falling on the control photocell. These results, wherein drift in the adjustment of the machine did not become a matter of concern, were obtained under the normally encountered variations in humidity, ambient light, temperature, and vibration.

The pick-up scanning through the central aperture for the control photocell, looks at a very small portion only of the templet at any one time. In fact the pick-up unit will produce its maximum output signal from a change in the templet outline over a region no greater, after magnification by the objective lens, than the central aperture 79 of the control photocell. The pick-up unit will effectively follow the outline of the templet as long as the control photocell aperture is permitted to scan an equivalent area of the templet. This feature of scanning a small region only of the templet at any one time minimizes the effect of random disturbances in the system or in the ambient illumination, and thereby further improves the accuracy of the machine.

The sinusoidal output signal across the load resistor 91 is supplied to the grid or control electrode 93 of a triode amplifier 94. Triode 94 is connected as a cathode follower, its anode 95 being connected to a source of voltage indicated by B+ and its cathode being returned to the negative side of load resistor 91 through cathode load resistor 96. The output signal is developed across resistor 96 at a reduced impedance level in order to facilitate transmission without excessive interference pickup to a suitable amplifier located at a distance. The signal is coupled out through blocking capacitor 97 in order to eliminate the direct current component.

*Tracer head structure*

Figures 7, 7A:
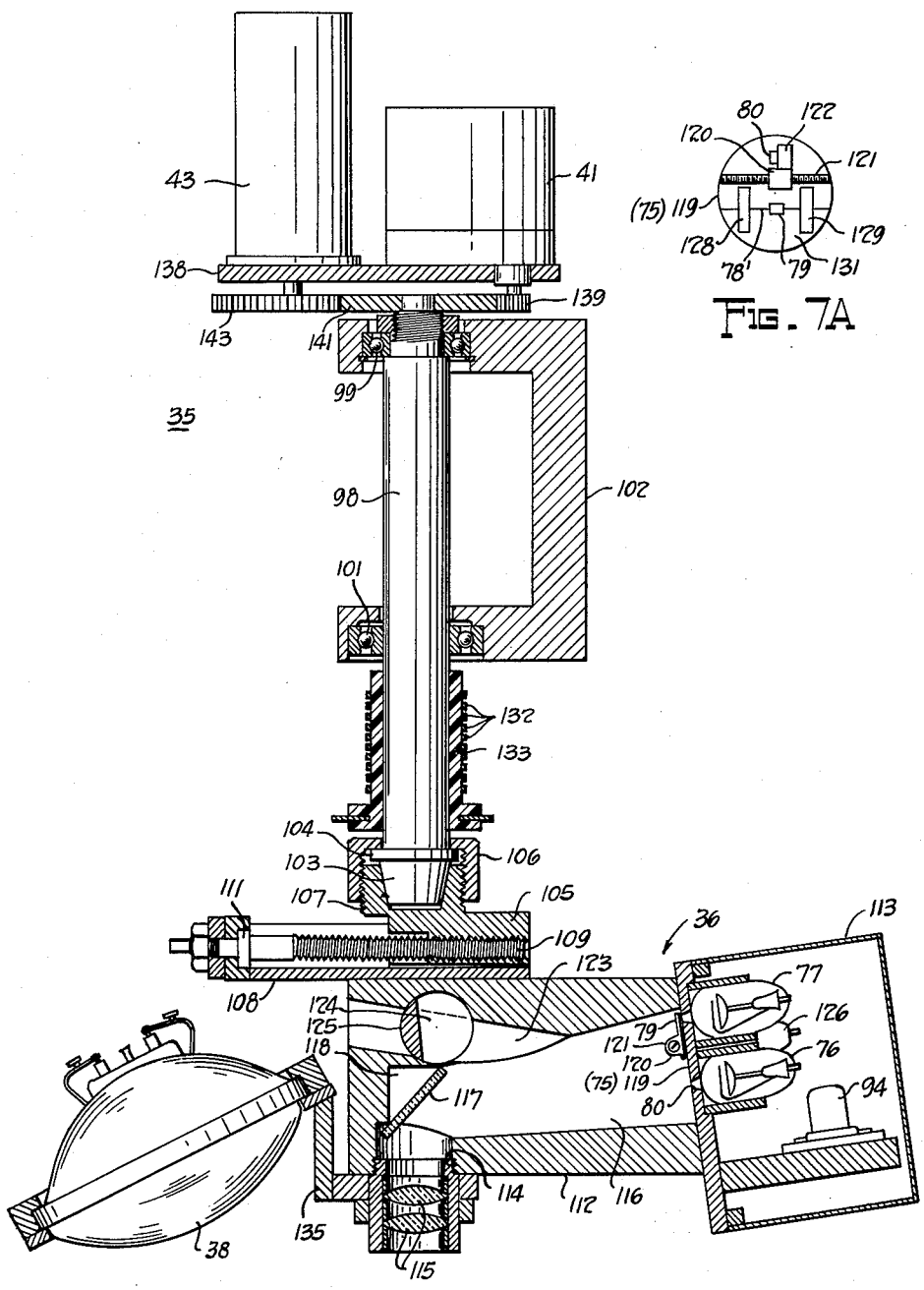
FIG. 7 is a vertical elevation view, partly in section, of a tracer head comprising the photocell pick-up unit along with the $\phi$ servo motor and the resolvers.
FIG. 7A is a detail showing the mask located in front of the photocells.

The tracer head 35 actually incorporated in the automatic milling machine illustrated in FIGS. 1 and 2, is that shown in FIG. 7. It is, of course, constructed in accordance with the principles which have been explained by reference to FIGS. 5 and 6 but has mechanical features and other improvements making it better adapted to a machine tool. The tracer head comprises a main spindle 98 mounted in upper and lower ball bearing assemblies 99, 101 supported in a U-shaped bracket 102 which is fastened to the side of beam 16. The axis of the spindle 98 constitutes the vertical axis of the tracer head previously stated to swing in an arc intersecting the axis of the master turntable 3. The lower end of the spindle terminates in a tapered portion 103 at the base of which is an outwardly directed circumferential flange 104. The tapered portion 103 is received in a mating socket in an upstanding boss 107 of inner slide member 105, the latter is locked onto the spindle in suspended relation by means of a coupling nut 106 which has an inturned shoulder overlapping the flange 104 and is internally threaded to engage the external threaded portion of the upstanding slide boss 107. The inner slide member is dovetailed in cross section and slidingly supports an outer or dependent lower slide member 108. A screw 109 threaded into the inner slide and having an outwardly expanded portion 111 axially fixed with respect to the outer slide, allows a micrometer adjustment of the lateral displacement of the outer lower slide with respect to the inner.

The lower slide 108 has fastened to its underside the pick-up unit 36 comprising a hollow casing 112 across the open end of which is mounted a light-proof photocell box 113. The casing 112 is generally rectangular in form and has a threaded bottom opening 114 in line with the axis of the spindle 98 when the slides are centrally adjusted. This bottom opening 114 accommodates an objective lens system 115 which projects an image of the region about the edge of the templet upwardly, similarly to the lens 74 previously described. The opening 114 communicates with a lateral passageway 116 through the casing which passage terminates at front wall 119 of the box 113 behind which wall are mounted the control photocell 76 and the reference photocell 77. The image projected by the objective lens system is reflected laterally through the passageway 116 and onto the wall 113 by an inclined front surface mirror 117 fastened to a suitable mounting plug 118. The wall 119 of the box 113 facing the passageway 116 corresponds to the mask 75 and is provided with the central aperture 79 for the control photocell and the rim aperture 80 for the reference photocell. The size of the rim aperture is conveniently adjusted by means of a sliding shutter 120 slidable laterally across the face of the mask wall 119. This shutter has a hub portion which threadedly receives a transverse axially fixed adjusting screw 121 and a laterally projecting portion 122 reaching over the rim aperture (FIG. 7A). By turning screw 121, the shutter is adjusted to cover a larger or smaller portion of the rim aperture 80 so as to equalize the amount of light received by the control and reference photocells when the image of the edge of the templet bisects the control aperture, as indicated by shadow line 78'. Passageway 123 through the casing 112 is a peep hole for inspecting the front wall 119 of the box 113 whereon the image of the templet is projected by the lens system. The peep hole is normally closed by means of a rotary shutter in the form of a cylinder 124 having the major portion of its cross-section removed except for a chordlike segment 125, where it intersects passageway 123. The peep hole is opened by rotating the shutter 124 to move the chordlike segment 125 into the upper wall of casing 112.

The slide members 105, 108 permit the optical axis of the pick-up unit to be displaced with respect to the vertical rotational axis of the tracer head, that is, with respect to the axis of spindle 98. Since the error axis of the pick-up unit is maintained perpendicular to the edge of the templet, as will be described in detail hereinafter, the slide adjustment may be used to compensate for variations in cutter diameter and permits the operator to take rough and finish cuts. It also permits templets to be made with or without allowance for cutter radius. When the templet is made without allowance for cutter radius, the slide is adjusted to displace the optical axis of the pick-up unit a distance from the rotational axis of the tracer head which is equal to four times the cutter radius, in accordance with the 4 to 1 ratio of templet to work. When the templet is made with allowance for cutter radius, the slide is adjusted to bring the optical axis of the pick-up unit into line with the rotational axis of the tracer head.

The pick-up unit 36 contains, in addition to the control and reference photocells, a second pair of photocells 126, 127 which operate as tangency detectors, and are located one on each side of the reference and control photocells. In FIG. 7 the pick-up unit appears in cross-section so that only photocell 126 appears therein, it being understood that the photocells 126 and 127 are symmetrically disposed relative to the photocells 76 and 77. Referring to FIG. 7A, the front face 119 of the cell box 113 is provided with apertures 128, 129 in the form of elongated slots symmetrically disposed on either side of the central aperture 79 and with their longer dimension parallel to the error axis, that is the axis joining the centers of the central and rim apertures. The shaded area 131 represents the shadow of the templet projected by the lens system and mirror onto the mask wall or face 119. When the error axis of the pick-up unit is normal to the templet edge slots 128, 129 will be equally shadowed by the templet and both tangency photocells will receive equal quantities of light. However, if the error axis should depart from perpendicularity to the edge of the templet, the quantity of light received by one tangency photocell will increase whereas that received by the other will decrease, depending upon the direction of the departure, and the difference in the light quantities will be proportional to the extent of the departure. The tangency photocells 126, 127 are connected in an A.C. null bridge like that into which the control and reference photocells operating as the error detectors are connected and which was described with reference to FIG. 6. The output of this tangency control bridge is an A.C. signal varying in phase and magnitude with the direction and degree of departure of the error axis of the pick-up unit from perpendicularity to the edge of the templet.

Photocell box 113 contains, in addition to the error photocells 76, 77 and the tangency photocells 126, 127, some of the other elements of the two photocell bridges of the type shown in FIG. 6 and including the triode electronic tubes 95. The connections to the two photocell bridges for supplying the anode voltages and for receiving the output signals of the error and tangency bridges, are made through slip rings 132 mounted on insulating sleeve 133 near the lower end of the spindle 98. The slip rings are contacted by suitable brushes (not shown in the drawing) and the output signals from the photocell bridges are conducted to electronic amplifiers.

The light source 38 consisting of a sealed beam type incandescent lamp is mounted in a bracket 135 supported from casing 112.

The error signal E is supplied to error resolver 42 whereas the tangency departure signal $\Delta\phi$ is supplied to $\phi$ servo motor 41. Error resolver 42, resolver 43 (receiving a feed signal F) and $\phi$ servo motor 41 are mounted on a bracket 138 located above the spindle 98 and supported by the beam 16 to which it is secured. The $\phi$ servo motor has an integral gear reducer and is provided with a pinion 139 below the bracket 138 which pinion engages spur gear 141 fast on the upper end of the spindle 98. The pitch ratios of the pinion and spur gear are selected to effect a considerable speed reduction from motor to spindle. Resolvers 42, 43 have their rotors mechanically coupled to turn in unison with spindle 98, the rotor shafts being provided with spur gears 142, 143 below the bracket 138 which spur gears engage the spur gear 141 in a 1 to 1 ratio. Thus as the tangency detectors, through their bridge and associated amplifier, produce a signal $\Delta\phi$ proportional in phase and magnitude to the direction and extent of departure of the error axis from perpendicularity to the templet edge, $\phi$ servo motor 41 rotates the pick-up unit in the required direction to reduce the tangency departure or signal $\Delta\phi$ to zero. The continuous correction of the tangency departure causes the pick-up unit and also the resolvers, to be displaced through an angle $\phi$ from their reference directions. The angle $\phi$ corresponds substantially to the angle which a tangent to the templet edge at the detection point makes with respect to the beam axis, that is the axis including the pivot point of the beam and the vertical axis of the tracer head.

*Amplifier and demodulator*

An electronic amplifier suitable for amplifying the N and R velocity signals from the resolvers, and also a demodulator for converting the amplified A.C. output signal of the amplifier into a D.C. signal, are shown diagrammatically in FIG. 8. The input A.C. signal supplied to terminals 144 is applied across grid or control electrode and cathode of a triode electronic tube 145. The anode of tube 145 is connected through a load resistor 146 to the positive terminal of a source B of unidirectional voltage having terminals 147. A cathode resistor 148 and by-pass capacitor 149 for the triode 145 operate in conventional fashion to provide grid bias. The negative terminal of the source B is connected to both the resistor 148 and the capacitor 149 and to one of the A.C. signal terminals 144. The output signal from the anode is supplied through coupling capacitor 151 to the grid of triode 152, resistor 153 serving as a grid return to the negative of the source B. The triode 152 operates as a phase inverter and is provided with anode and cathode load resistors 154, 155 respectively, the signals at the anode and the cathode are in opposite phase and are supplied through coupling capacitors 156, 157 to the grids of output tubes 158, 159 respectively. Resistors 161, 162 are connected to the negative terminal of the B source and serve as grid return resistors for the output tubes 158, 159. The anodes of these tubes are connected to opposite sides of center-tapped primary winding 163 of output transformer 164. The center tap of the primary winding is connected to the positive side of the unidirectional voltage supply B and the cathodes are returned to the negative side through a biasing resistor 165. The output tubes 158, 159 operate as a push-pull amplifier in conventional fashion. The amplified output signal is an A.C. signal in the same phase as the input signal and varying in magnitude proportionally to the input signal and appears across the secondary winding 166 of the output transformer.

The demodulator circuit serves to convert the A.C. signal into a D.C. signal the magnitude of which is proportional to that of the A.C. signal and the polarity of which is reversed when the phase of the input signal reverses. It comprises an A.C. reference signal transformer 167 having a primary winding 168 which is energized at input terminals 169 with an A.C. reference voltage. By a reference voltage is meant a voltage which is constant in value and which is in exact phase at all times with the phase of the A.C. signal delivered to other reference points, for instance, the A.C. reference input terminals connected to the primary 88 of the transformer 87 of the photocell bridge shown in FIG. 6. The reference transformer 167 has a pair of center-tapped secondary windings 171, 172 whose center taps are connected to opposite sides of the secondary winding 166 which supplies the A.C. input signal required to be demodulated. The outer terminals of secondary winding 171, 172 are connected through rectifier elements to D.C. output terminals 173, 174. Connections are such that outer terminals of opposite phase in the secondary windings 171, 172 are connected through rectifiers restricting current flow to the same direction to each D.C. output terminal. Thus transformer terminals 175, 176 which are in opposite phase are connected through rectifier elements 177, 178 to D.C. output terminal 173. Transformer terminals 179, 181 which are in opposite phase to each other and also in opposite phase to terminals 175, 176, are connected through rectifiers 182, 183 to D.C. output terminal 174. A pair of equal load resistors 184, 185 are connected in series across D.C. output terminals 173, 174 and have their common point 186 connected to the center tap of secondary winding 166 of the input signal transformer.

In operation, assuming a constant A.C. reference voltage having an average value $E_k$ and an input A.C. signal having an average value $E_i$, rectifiers 177, 178 conducting on opposite half cycles will produce across load resistor 184 a full wave rectified voltage of average value $E_a$ according to the following relation:

$$E_a = +|\overline{E_k} + \overline{E_i}|$$

wherein the vertical lines denote absolute values and wherein $E_a$ is always positive and becomes zero when $E_i$ is equal to $E_k$ and of opposite phase, that is, 180° out of phase. This relationship is depicted graphically by dotted curve 187 in FIG. 8a.

Similarly rectifiers 182, 183 conducting on opposite half cycles will produce across load resistor 185 a full wave rectified voltage of average value $E_b$ according to the following relation:

$$E_b = -|\overline{E_k} + \overline{E_i}|$$

wherein the vertical lines again denote absolute values and wherein $E_b$ is always negative (when measured in the same loop direction as $E_a$) and becomes zero when $E_i$ is equal to $E_k$ and of opposite phase or 180° out of phase. This relationship is depicted graphically by dotted curve 188 in FIG. 8a.

The output voltage $E_o$ measured across both resistors 184, 185 and appearing across output terminals 173, 174 is then the sum of these voltages, which yields the output characteristic shown as 189. The limits or maximum values of the D.C. output voltage may be varied by varying the magnitude of the A.C. reference voltage. Within such limits, the magnitude of the D.C. output signal is proportional to that of the A.C. input signal and its polarity is positive or negative according as to whether the A.C. input signal is in phase or 180° out of phase with the A.C. reference signal.

Control system

The overall organization of a control system in accordance with the invention for an approximately polar type profile milling machine such as that shown in FIGS. 1 and 2 is illustrated schematically in FIG. 9. In the geometry of the machine, the point A is the vertical turning axis of beam 16, that is, the axis of the pivot post 15; point B is the vertical rotational axis of the templet turn table and the point C is the vertical rotational axis of the tracer head 35. Line AB may be referred to as the table axis and line AC as the beam axis. The variable angle therebetween will be referred to as $\theta$. Letting $\phi$ denote the angle between a tangent to the curve of templet 78 at observation point C and the projection of beam line axis AC, the same angle $\phi$ will also represent the angle between a normal to the beam line axis and a normal to the templet curve at C. Thus as $\theta$ increases a normal to the beam axis AC advances clockwise through an angle $$\frac{\theta}{2}$$

with respect to line BC. Therefore, in a mathematically exact polar plot, the angle $\phi$ would have to be reduced by $$\frac{\theta}{2}$$

in order to obtain the angle $\phi_r$ which the normal to the templet curve makes with respect to the line BC (which line is designated R, the radius of the turntable at the observation point). In practice however, the angle $\theta$ varies through a relatively small range only; by adjusting the tracer head so as to eliminate the error between $\phi$ and $\phi_r$ at the mean points of the operating range, the error in $\phi$ occasioned by the neglect of the departure $$\frac{\theta}{2}$$

may be neglected. The remaining error is then corrected as part of the normal error correction and the overall impairment in accuracy of the system is negligible.

For purposes of explanation, the tracer head 35 will now be considered to be in proper alignment at the observation point. It will be appreciated that whereas the optical tracer heads of FIGS. 5 and 7 are best suited to the control system now to be described, other non-optical tracer heads, for instance, contact or stylus type tracer heads, may likewise be used provided that they produce output signals of the same nature.

When tracer head 35 is properly aligned, central aperture 79 is bisected by the edge 78′ of the templet images and the error axis is normal to the image of the templet edge. The slots 128, 129 of the tangency photocells 126, 127 are equally shadowed by the projection of the templet so that the output of the tangency bridge is zero.

If now the situation should be regarded at an instant, when, due to the rotation of the turntable or the changing shape of the templet, an error and a departure from tangency have occured, the sequence of events is as follows: One of the tangency photocells will be shadowed more than the other so that modulator 191 FIG. 9, which may be similar to the photocell bridge described earlier by reference to FIG. 6, will produce an A.C. signal varying in phase and magnitude with the direction and extent of departure from tangency. This signal, which may be referred to as $\Delta\phi$, is amplified by amplifier 192 which may be an electronic amplifier similar to that described by references to FIG. 8 (but without the demodulator circuit). Amplifier 192 supplies the amplifier $\Delta\phi$ signal to winding 193 of $\phi$ servo motor 41. This motor, which may be a fractional horsepower two-phase induction motor, has electrically displaced windings 193, 194. Winding 194 is energized in leading phase from the A.C. reference voltage at terminals 195 through a series capacitor 196. As previously explained the motor 41 is provided with the pinion 139 mating with the spur gear 141 on the spindle 98 which supports the pick-up unit 36. Thus the rotation of the motor 41 causes the photocells to rotate back into tangency whereby the $\Delta\phi$ signal is reduced to zero. It will be appreciated, of course, that the correction of tangency departure occurs continuously rather than in discrete steps, so that the tangency departure is always small and the error axis of the tracer head is continuously maintained at an angle $\phi$ with respect to the normal to the beam.

Thus, due to the normal alignment of the error axis of the pick-up unit relative to the edge of the templet, which alignment is maintained through the described rotation of the tracer head by the $\phi$ servo motor in response to the signals from the tangency detectors, the error will always be measured in a direction substantially normal or perpendicular to the templet edge. The error will cause unequal illumination of the central aperture 78 relative to rim aperture 79 resulting in the generation of an error signal E in modulator 197 into which control photocell 76 and reference photocell 77 are connected. Modulator 197 may consist of a photocell bridge similar to that which has previously been described by reference to FIG. 6. It produces an A.C. signal whose magnitude is proportional to the difference in the quantity of light falling on the cells and whose phase is indicative of which cell receives the most light. The A.C. output signal from the modulator is supplied to amplifier 198 which may consist of an electronic amplifier such as was described earlier by reference to FIG. 8. The amplifier supplies error signal E to the winding of rotor 199 of error resolver 42. The resolver provides two output signals both proportional to the input signal E. Such signals are, in addition, proportional one to the sine, and the other to the cosine of the angle through which the rotor has been displaced from a reference axis.

Rotor 199 of the resolver 42, and also rotor 200 of the resolver 43, are, as stated earlier, geared in a 1 to 1 ratio with the spindle 98 supporting the pick-up unit 36 and all turn through angle $\phi$ in unison. The resolvers comprise ring-like stators 201 on which are wound two pairs of displaced windings, the windings in each pair being connected in series. When the rotor 199 of the resolver 42 is positioned so that angle $\phi$ is zero, the magnetic flux produced by the rotor will intercept the turns of windings 203 partly in one direction and partly in the other so that the resultant voltage in such pair of windings will be zero. At the same time, the voltages induced in windings 202, the other pair, will be a maximum. By suitable distribution of the turns of the windings, the voltage generated in the windings 203 is proportional to sin $\phi$ whereas the voltage generated in windings 202 is proportional to cos $\phi$.

It will be appreciated that the resolvers which have been shown in the drawings are intended for illustrative purposes only. Other suitable pick-up units providing output signals proportional to the sine and cosine of the angle through which a control element is rotated, may likewise be used for the purpose. In practice, commercially available units with distributed type stator windings are used.

The windings on rotor 200 of the resolver 43 is supplied with an A.C. signal F from a feed control unit 204. This unit may consist of a variometer or a simple rheostat providing an adjustable A.C. voltage upon manual rotation of control knob 205. Winding pairs 206 and 207 angularly displaced on the stator ring 201 of the resolver 43 provide output signals proportional to input signal F and varying with the sine and cosine respectively of angle $\phi$.

Considering again the geometry of the system, the relative motion between a point on the templet and the pick-up unit may be represented by a component F tangential to the templet edge, and a component E normal to the templet edge. The components are designated E and F to correspond to the error signal E derived from the tracer head 35 and the feed signal F derived from the feed control 204. If these E and F vectors are resolved into orthogonal components respectively parallel and normal to the beam axis AC, vector F resolves into components $F \cos \phi$ and $F \sin \phi$, and vector E resolves into components $E \sin \phi$ and $E \cos \phi$. The addition of the components parallel to the beam, namely, $$F \cos \phi + E \sin \phi$$

provides the tangential velocity of a point on the turntable at the radius R equal to the distance BC (disregarding the small error resulting from the neglect of $$\frac{\theta}{2})$$

The tangential velocity of that point on the table is proportional to the product of radius and angular velocity of the table, that is to the rate of change of the angle N; in conventional notation it is proportional to $$R \cdot \frac{dN}{dt}$$

In accordance with the invention, variable speed D.C. motor 14 which drives the turntables is energized by a signal proportional to $E \sin \phi + F \cos \phi$. To this end, windings 203 of resolver 42 and 207 of resolver 43 are connected in series across the input terminals of amplifier 208 which may be similar to the electronic amplifier described earlier by reference to FIG. 8. The output of the amplifier is supplied to demodulator 209 which may be similar to that described earlier by reference to FIG. 8. The output of the demodulator is a D.C. signal varying in magnitude and polarity with the magnitude and phase of the resultant of the input signal $E \sin \phi + F \cos \phi$. The demodulator may be supplied with an A.C. reference voltage at terminals 220 which determines the limits of the D.C. output voltage of the demodulator.

The output signal of the demodulator 209 is supplied to control winding 210 of a separately excited D.C. generator 211 which is driven by a relatively constant speed source such as a 3-phase induction motor 212. Generator 211, which may be of the type generally known as an amplidyne, has those brushes which would in a simple shunt machine be the output brushes, short-circuited as indicated at 213. The circulating current resulting from the energization of the control winding 210 produces a quadrature magnetic field with a forcing action. The quadrature field in turn causes the generation of a voltage across quadrature brushes 214. These brushes now serve as the output brushes handling an amount of power which, as is well known, may be as much as a thousand times greater than that supplied to the control winding 210. Winding 215, connected in series with the output circuit, is a compensating winding to offset the neutralization of the quadrature field resulting from the flow of load current through the armature. The output of the amplidyne 211 is supplied to D.C. shunt-wound motor 14 whose field winding 216 is energized in conventional fashion with a D.C. voltage. The rotor of motor 14, as previously described, drives work turntable 4 and templet turntable 4 through gear box 13, worms 6, 7, worm gears 8, 9 and the associated shafting.

As was pointed out earlier, the linear velocity of a point on the turntable at a distance R from the center of rotation is proportional to $$R \cdot \frac{dN}{dt}$$

and the signal $E \sin \phi + F \cos \phi$ translated by the N servo channel comprising amplifier 208, demodulator 209 and amplidyne 211 is proportional to this function. However motor 14, which may be referred to as the N channel servo motor, should receive a signal proportional to $$\frac{dN}{dt}$$

which would require attenuating the signal in proportion to R. According to a particular feature of the invention, this result is achieved through negative feed back to the N servo channel, specifically to amplifier 208, of a signal proportional to $$R \cdot \frac{dN}{dt}$$

Figure 3:
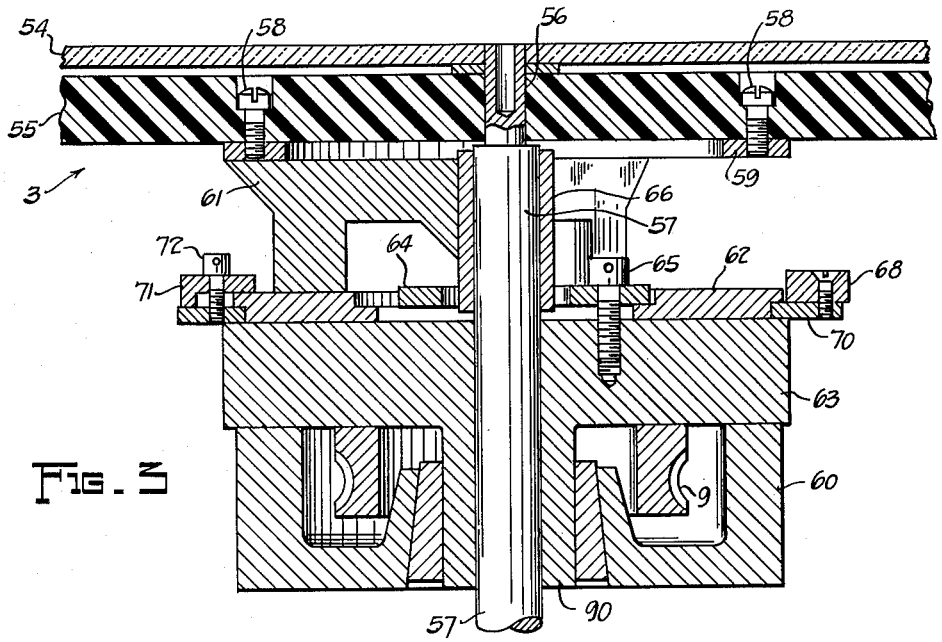
FIGS. 3 and 4 are sectional elevation and plan views respectively of a central fragment of the master turntable of the machine.
Figure 4:
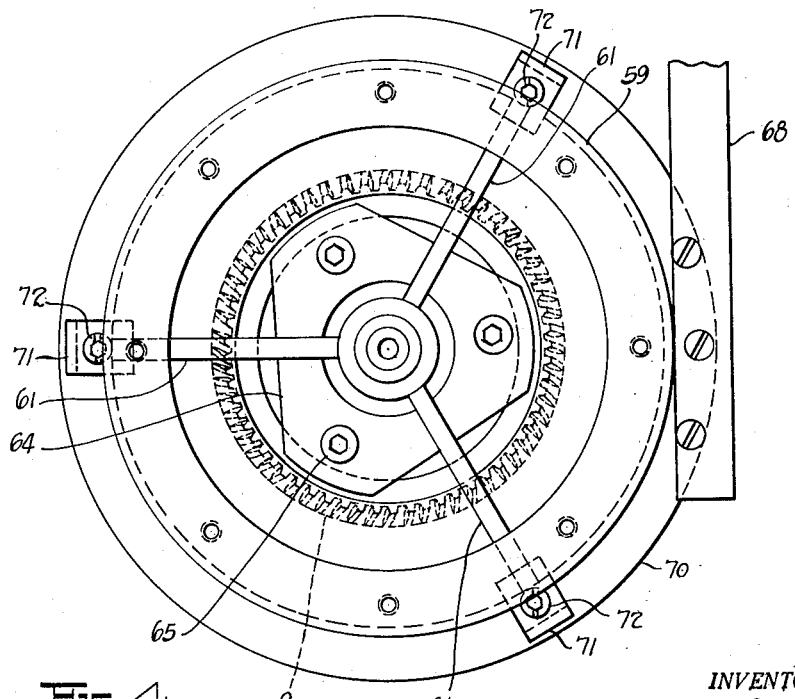

This is achieved by means of an induction potentiometer 30 (mounted on top of pivot post 15 in FIGS. 2 and 3) having input windings 217 and output windings 218. The input windings 217 are supplied with an A.C. reference voltage at input terminals 230. One set of the windings of the potentiometer is arranged to pivot through angle $\theta$ with beams 16 whereas the other set is fixed. By suitable distribution of the turns, the windings are proportioned such that the voltage induced in the output winding 218 is proportional to the angle $\theta$ by which it is displaced from the axis of the input winding. Accordingly, the output of the winding 218 is an A.C. signal of the same phase as the A.C. reference voltage and of a magnitude proportional to $\theta$ or substantially proportional to R in view of the fact that $\theta$ is relatively small or shifts through a relatively small range.

The signal from the winding 218 is supplied to one winding 221 of a drag cup generator 10 whose rotor is mechanically coupled to the rotor of N channel servo motor 14. Drag cup generator 10 may be constructed somewhat like a two-phase induction motor having one winding 221 as previously mentioned, and another winding 222 displaced by 90 electrical degrees from the former. When the rotor is stationary, since the windings are electrically in quadrature, the voltage supplied to input winding 221 will have no effect on ouput winding 222. However, rotation of the rotor, which may be of the copper cup type, causes a shifting of the field in proportion to its angular velocity. This causes a voltage to be induced in output winding 222 in proportion to the speed of rotor 10 or to the speed of motor 14 driving it. Since the input winding 221 is supplied with a signal proportional to R, the output of the winding 222 is a signal proportional to R and proportional to the angular velocity of the turntables; this output signal may be denoted $$R \cdot \frac{dN}{dt}$$

This signal is fed back to amplifier 208 so as to oppose the input signal $E \sin \phi + F \cos \phi$ supplied thereto from the resolvers and thus cause the output signal of the N servo channel to vary inversely with R, that is the radial distance of point C on the templet from the turntable center.

The relative radial velocity of a point on the turntable with respect to the pick-up unit is proportional to $$\frac{dR}{dt}$$

Since the length of the beam 16 is unchangeable, the relative radial velocity is substantially proportional to the rate of pivotal movement of beam 16 and that in turn is determined by the velocity of the D.C. motor 46 which operates through the gear box 45 and the screw rod 44 to swing the beam. The radial component of velocity, which may be denoted $$\frac{dR}{dt}$$

is also given by $E \cos \phi + F \sin \phi$ so that the latter signal, after suitable translation, may be used to control the servo motor 46, the R channel servo motor. To this end, the windings 206 of the resolver 43 and the windings 202 of the resolver 42 are connected in series across the input terminals of amplifier 223 in the R servo channel. This amplifier may be similar to that which has been described earlier with reference to FIG. 8 and is followed by a demodulator 224 likewise similar to that described earlier by reference to the same figure. The output of the demodulator 224 is a D.C. signal varying in magnitude and polarity with the magnitude and phase of the input signal $F \sin \phi + E \cos \phi$. The D.C. output signal from the demodulator 224 is supplied to control winding 225 of an armature excited D.C. generator or amplidyne 226, similar to the amplidyne 211 described earlier. The output of the amplidyne 226 is supplied to the motor 46 which has a field winding 227 energized from a D.C. source in the usual fashion.

In order to increase the operating range and speed of response of the R channel servo motor 46, a negative feed back signal is used. This signal originates in a tachometer generator 50 which is shafted to the motor 46. The tachometer generator may comprise in the usual fashion an armature with a constant flux magnetic field provided by a permanent magnet 229, so that the output voltage is proportional to the angular velocity of the rotor. The signal from the tachometer generator is fed back in series with the demodulator across the control winding 225 of the amplidyne 226 so as to achieve the desired negative feed-back effect.

The specific embodiment of the invention which has been described in detail is to be regarded as an illustrative example and the invention is not to be considered limited thereto. It will readily be appreciated that the inventive features of the optical tracer head are applicable to other constructions than the specific tracer head which has been described in detail. Where desired, a tracer head may be constructed with only a pair of photocell error detectors or again with only a pair of photocell tangency detectors. Furthermore the principle of comparison as betwen photocells in a pair, that is principles of measuring the distribution of light rather than its intensity in order to obtain the desired control signal may be realized by connecting the photocells in bridge circuits other than that which has been specifically described but equivalent thereto for the instant purpose.

As regards the control system for a polar type contour milling machine, it is desired to emphasize that the specific control elements which have ben described are given merely by way of illustration of an embodiment of the invention which has been actually constructed and found to operate as set forth which represents the best mode of practising the invention presently known. Obviously there are many electrical equivalents of the specific elements described. In the smaller sizes of machine tools, electrical control elements are generally more economical; however, in larger sizes of machine tools, hydraulic control elements are generally preferable from the point of view of accuracy and their cost then becomes comparable with or even less than electrical controls. The control system which has been described is equally applicable to other arrangements for translating signals into regulated displacements, for instance to a hydraulic system wherein the signals are subjected to equivalent transformations in accordance with the teachings which have been elaborated.

In accordance with the patent statutes the principles of the present invention may be utilized in various ways, numerous modifications and alterations being contemplated, substitution of parts and changes in construction being resorted to as desired, it being understood that the embodiment shown in the drawings and described above and the particular method set forth are given merely for purposes of explanation and illustration without intending to limit the scope of the claims to the specific details disclosed.

What I claim and desire to secure by Letters Patent of the United States is:

1. An automatic machine tool comprising work and templet supporting means constrained to equiangular displacement, a cutting head and a tracer head constrained to proportional displacement along paths substantially radial to the circular displacement paths of work and templet respectively, said tracer head comprising detecting means responsive to relative displacement between templet edge and tracer head along an error axis thereof and to departure of said error axis from normality to templet edge, means controlled by said detecting means for rotating said tracer head to maintain its error axis normal to templet edge, a feed rate controller, resolving means responsive to said detecting means and to said controller to provide trigonometric components of error and feed along axes substantially tangential and radial to the circular motion of said templet supporting means at said tracer head, means responsive to the tangential components of error and feed controlling the displacement of said supporting means, and means responsive to the radial components of error and feed controlling the displacement of the cutting and tracer heads.

2. An automatic machine tool comprising work and templet supporting means, means constraining said supporting means to equiangular circular movement, a cutting head and a tracer head and means providing equiangular displacement thereof about a pivot point, said tracer head comprising means responsive to relative displacement between templet edge and tracer head along an error axis and to departure of said error axis from normality to templet edge, a servo mechanism controlled by said detecting means for rotating said tracer head to maintain its error axis normal to templet edge, a feed rate controller, resolving means responsive to said detecting means and to said controller to provide trigonometric components of error and feed along axes substantially tangential and radial to the circular motion of said templet supporting means at the observation point of said tracer head, a servo mechanism responsive to the tangential components of error and feed rate controlling the circular motion of said supporting means, and a servo mechanism responsive to the radial components of error and feed controlling the angular displacement of the tracer and cutting heads about said pivot point.

3. An automatic machine tool comprising rotary work and templet tables, means constraining said tables to equiangular rotation about their respective axes, cutting and tracer heads and means constraining them to equiangular displacement about a pivot point, said tracer head comprising an error detector providing an error signal varying with the direction and extent of displacement between templet edge and tracer head along an error axis thereof, and a tangency detector providing a tangency signal proportional to the direction and extent of departure of said error axis from normality to templet edge, a servo mechanism responsive to said tangency signal for rotating said tracer head to maintain said error axis normal to templet edge, a rate controller providing a feed signal, resolving means receiving said error and feed signals and providing sine and cosine components thereof according to an angle $\phi$ substantially equal to the angle between a radius to the templet table and a normal to the templet edge at the observation point, a servo mechanism receiving the sin $\phi$ component of the error signal and the cos $\phi$ component of the feed signal to control the rotation of said tables, and a servo mechanism receiving the sin $\phi$ component of the feed signal and the cos $\phi$ component of the error signal to control the angular displacement of the cutting and tracer heads about said pivot point.

4. An automatic machine tool comprising rotary work and templet tables, means constraining said tables to equiangular rotation about their respective axes, cutting and tracer heads and support means constraining them to equiangular displacement about a pivot point, said tracer head comprising an error detector providing an A.C. signal varying in phase with the direction and in magnitude with the extent of displacement between templet edge and tracer head along an error axis thereof, and a tangency detector providing a signal varying with the direction and extent of departure of said error axis from normality to templet edge, a servo mechanism controlled by said tangency detector for rotating said tracer head to maintain its error axis normal to templet edge, a rate controller providing an A.C. feed signal, a pair of resolving means each comprising an input winding and a pair of output windings providing output signals proportional respecitvely to the sine and cosine of the angular displacement of the input winding from a reference position, means constraining said input windings to the same angular displacement as that of said error axis relative to a radius to the templet table at the observation point of the tracer head, a servo channel receiving the sine component of the error signal and the cosine component of the feed signal and comprising means translating these components into a driving signal and driving means for said tables energized thereby, and a servo channel receiving the sine component of said feed signal and the cosine component of said error signal and comprising means translating these components into a driving signal and driving means controlling the angular displacement of said support means for said cutting and tracer heads energized thereby.

5. An automatic machine tool comprising rotary work and templet tables, means constraining said tables to equiangular rotation about their respective axes, cutting and tracer heads and support means constraining them to equiangular displacement about a pivot point, said tracer head comprising an error detector providing an A.C. signal varying in phase with the direction and in magnitude with the extent of displacement between templet edge and tracer head along an error axis thereof, and a tangency detector providing a signal varying with the direction and extent of departure of said error axis from normality to templet edge, a servo mechanism controlled by said tangency detector for rotating said tracer head to maintain its error axis normal to templet edge, a rate controller providing an A.C. feed signal, a pair of resolving means each comprising an input winding and a pair of output windings providing output signals proportional respectively to the sine and the cosine of the angular displacement of the input winding from a reference position, means constraining said input windings to the same angular displacement as that of said error axis relative to a radius to the templet table at the observation point of the tracer head, a servo channel receiving the sine component of the error signal and the cosine component of the feed signal and comprising a demodulator converting the A.C. input signal into a D.C. output signal varying in polarity and magnitude with the phase and magnitude of the input signal, an amplidyne generator for amplifying said D.C. output signal and a D.C. driving motor for rotating said tables energized by said amplidyne, and a servo channel receiving the sine component of said feed signal and the cosine component of said error signal and comprising a demodulator converting the A.C. input signal into a D.C. output signal varying in polarity and magnitude with the phase and magnitude of the input signal, an amplidyne generator for amplifying said D.C. output signal and a D.C. motor controlling the angular displacement of said support means for said cutting and tracer heads energized by said amplidyne.

6. An automatic machine tool comprising rotary work and templet tables and means constraining said tables to equiangular rotation about their respective axes; cutting and tracer heads and support means constraining them to equiangular displacemetnt about a pivot point, said tracer head comprising an error detector providing an A.C. signal varying in phase with the direction and in magnitude with the extent of displacement between templet edge and tracer head along an error axis thereof, and a tangency detector providing a signal varying with the direction and extent of departure of said error axis from normality to templet edge; a servo mechanism controlled by said tangency detector for rotating said tracer head to maintain its error axis normal to templet edge, a rate controller providing an A.C. feed signal; a pair of resolving means each comprising an input winding and a pair of output windings providing output signals proportional respectively to the sine and cosine of the angular displacement of the input winding from a reference position; means constraining said input windings to the same angular displacement as that of said error axis relative to a radius to the templet table at the observation point of the tracer head; an N servo channel receiving the sine component of the error signal and the cosine component of the feed signal as an N input signal and comprising first translation means translating said N input signal into a driving signal and driving means for said tables energized thereby, said first translation means being proportioned to make the tangential velocity of templet relative to tracer head at said observation point proportional to said N input signal; and an R servo channel receiving the sine component of said feed signal and the cosine component of said error signal as an R input signal and comprising second translation means translating said R input signal into a driving signal and driving means controlling the angular displacement of said support means for said cutting and tracer heads energized thereby, said second translation means being proportioned to make the radial velocity of tracer head relative to templet at said observation point proportional to said R input signal.

7. An automatic machine tool comprising rotary work and templet tables and means constraining said tables to equiangular rotation about their respective axes; cutting and tracer heads and support means constraining them to equiangular displacement about a pivot point, said tracer head comprising an error detector providing an A.C. signal varying in phase with the direction and in magnitude with the extent of displacement between templet edge and tracer head along an error axis thereof, and a tangency detector providing a signal varying with the direction and extent of departure of said error axis from normality to templet edge; a servo mechanism controlled by said tangency detector for rotating said tracer head to maintain its error axis normal to templet edge, a rate controller providing an A.C. feed signal, a pair of resolving means each comprising an input winding and a pair of output windings providing output signals proportional respectively to the sine and cosine of the angular displacement of the input winding from a reference position; means constraining said input windings to the same angular displacement as that of said error axis relative to a radius to the templet table at the observation point of the tracer head; an N servo channel receiving the sine component of the error signal and the cosine component of the feed signal as an N input signal and comprising first translation means translating said N input signal into a driving signal and driving means for said tables energized thereby, said first translation means including means providing negative feed-back substantially proportional to the instantaneous product of angular templet table velocity and radial distance of said observation point from templet table axis in order to make the tangential velocity of templet relative to tracer head at said observation point substantially proportional to said N input signal; and an R servo channel receiving the sine component of said feed signal and the cosine component of said error signal as an R input signal and comprising second translation means translating said R input signal into a driving signal and driving means controlling the angular displacement of said support means for said cutting and tracer heads energized thereby, said second translation means including means providing negative feed-back substantially proportional to the angular velocity of said support means for said cutting and tracer heads whereby to make the radial velocity of tracer head relative to templet at said observation point substantially proportional to said R input signal.

8. An automatic machine tool comprising work and templet supporting means, each mounted so as to permit circular movement about an axis, means constraining said supporting means equiangular displacement, a cutting head mounted on a pivoted arm so as to swing in an arc, the pivot axis of said arm being parallel to the axis about which said work supporting means turns and so located as to permit motion of said cutting head in an arc in a direction approximately radial to the circular path of said work supporting means, a tracer head also mounted on a pivoted arm so as to swing in an arc, the pivot axis of said arm being parallel to the axis about which said templet supporting means turns and so located as to permit motion of said tracing head in a direction approximately radial to the circular path of said templet supporting means, means constraining the arm mounting the cutting head and the arm mounting the tracing head to equiangular motion, said tracer head comprising means responsive to relative displacement between templet edge and tracer head along an error axis thereof and means for detecting the angular relationship between said error axis and the templet edge, a feed controller, a device responsive to said detecting means for maintaining said error axis normal to the edge of the templet, resolving means responsive to signals from said feed controller and from said tracing head, and servomechanisms responsive to said resolving means for effecting angular displacement of said work and templet supporting means and said cutting and tracing heads about their respective axes.

9. An automatic machine tool comprising work and templet supporting means constrained to equiangular displacement, a cutting head and a tracer head constrained to proportional displacement along paths substantially radial to the circular displacement paths of work and templet respectively, said tracer head comprising detecting means responsive to relative displacement between templet edge and tracer head along an error axis thereof and to departure of said error axis from perpindicularity to emplet edge, a servomechanism responding to said detecting means for rotating said tracer head to maintain its error axis perpendicular to templet edge, a manually operable linear adjusting device associated with said tracer head to facilitate selectively displacing said tracer head in the direction of the error axis, a feed rate controller, resolving means responsive to said detecting means and to said controller to provide trigonometric components of error and feed along axes substantially tangential and radial to the circular motion of said templet supporting means at said tracer head, means responsive to the tangential components of error and feed controlling the displacement of said supporting means, and means responsive to the radial components of error and feed controlling the displacement of the cutting and tracing heads.

10. An automatc machine tool comprising rotary work and templet supporting means constrained to equiangular movement, a cutting head and a tracer head mounted on a pivoted structure, said tracer head comprising optical means responsive to relative displacement between templet edge and tracer head along an error axis and to departure of said error axis from normality to templet edge, a servomechanism controlled by said optical means for rotating said tracer head to maintain its error axis normal to templet edge, a manually operated linear adjusting device associated with said tracer head to facilitate selectively displacing said tracer head in the direction of the error axis with respect to said pivoted structure, a feed rate controller, a resolver responsive to said tracer head and to said controller to provide components of error and feed along axes substantially tangential and radial to the circular or rotary motion of said templet supporting means, a servomechanism responsive to the tangential components of error and feed rate controlling the rotary motion of said supporting means, and a servomechanism responsive to the radial components of error and feed controlling the angular displacement of said pivoted structure mounting the cutting and tracer heads.

References Cited in the file of this patent

UNITED STATES PATENTS

| | | |
|---|---|---|
| 1,965,224 | Ernst et al. | July 3, 1934 |
| 2,332,533 | Roehm | Oct. 26, 1943 |
| 2,412,499 | Ernst et al. | Dec. 10, 1946 |
| 2,419,641 | Hart | Apr. 29, 1947 |
| 2,506,734 | O'Brien | May 9, 1950 |
| 2,661,661 | Zoll | Dec. 8, 1953 |
| 2,863,363 | Schmid | Dec. 9, 1958 |
| 2,866,391 | Gunderson | Dec. 30, 1958 |
| 2,872,852 | Meyer | Feb. 10, 1959 |